United States Patent
Morita et al.

(10) Patent No.: US 8,381,537 B2
(45) Date of Patent: Feb. 26, 2013

(54) BRINE COMPOSITION FOR FROZEN FOOD AND METHOD FOR PRODUCING FROZEN FOOD

(75) Inventors: Hideo Morita, Otsu (JP); Fumio Noda, Moriya (JP)

(73) Assignee: Tetsuya Sugino, Ishikawa (JP)

( * ) Notice: Subject to any disclaimer, the term of this patent is extended or adjusted under 35 U.S.C. 154(b) by 825 days.

(21) Appl. No.: 12/359,630

(22) Filed: Jan. 26, 2009

(65) Prior Publication Data

US 2009/0196965 A1     Aug. 6, 2009

(30) Foreign Application Priority Data

Feb. 1, 2008   (JP) .................................. 2008-23272

(51) Int. Cl.
   *C09K 5/04*          (2006.01)
(52) U.S. Cl. ........................................... 62/114; 62/529
(58) Field of Classification Search .............. 62/72, 114, 62/330, 529; 568/840, 844; 426/234, 654
   See application file for complete search history.

(56) References Cited

U.S. PATENT DOCUMENTS 4,112,699 A * 9/1978 Hudson et al. .................. 62/3.1
4,450,692 A * 5/1984 Sharpe et al. ................... 62/233

FOREIGN PATENT DOCUMENTS

| JP | 1993-221296 | * 4/1993 |
| JP | 08-126465 | 5/1996 |
| JP | 3639499 | 4/2005 |

* cited by examiner

*Primary Examiner* — Mohammad Ali
*Assistant Examiner* — Daniel C Comings
(74) *Attorney, Agent, or Firm* — Renner, Otto, Boisselle & Sklar, LLP

(57) ABSTRACT

The present invention provides a brine composition for a frozen food which does not raise the freezing temperature even if the ethanol concentration is low, and is therefore able to suppress tissue breakdown caused by the growth of water ice crystals in the tissues (cells) of foods, and a method for producing a frozen food. The brine composition for a frozen food contains 30 to 70% by weight of ethyl alcohol, 0.5 to 10.0% by weight of erythritol, and water. It is preferable that the concentration of the ethyl alcohol is 35 to 60% by weight, the concentration of the erythritol is 0.8 to 5.0% by weight, and the rest is water.

10 Claims, 2 Drawing Sheets

BRINE COMPOSITION FOR FROZEN FOOD AND METHOD FOR PRODUCING FROZEN FOOD

BACKGROUND OF THE INVENTION

1. Field of the Invention

The present invention relates to a brine composition for a frozen food, which is used for a brine freezing method for foods, and also relates to a method for producing a frozen food.

2. Description of the Related Art

Both at home and abroad, freezing food is an inevitable topic that needs to be addressed regarding requirements such as the beneficial use of foods upon surplus harvest and bumper catch, adaptation to diversification of dietary habits, and inclination to safe and reliable foods free of additives in addition to the fact that more elaborate and delicious frozen foods are desired.

In order to provide consumers with delicious frozen foods, the following three requirements must be satisfied: acquisition of fresh materials, freezing and thawing techniques to maintain the deliciousness of foods before freezing, and processing techniques suitable for freezing and thawing. In addition, infrastructure development for the distribution of frozen foods is also essential.

Food freezing methods are classified into air blast systems, contact freezing systems, brine systems, liquid nitrogen or liquid carbon dioxide gas freezing systems, and the like depending on the cooling medium used.

Among them, a method of contacting foods with cold air in a freezer (air blast system) is well known. However, the cold air flow hardly contacts the foods sufficiently and that tends to cause uneven freezing on the back, side, and bottom surfaces of the foods placed in the freezer. In addition, due to low heat conductivity, the time for the foods to be frozen to pass through the maximum ice crystal generation zone (−1 to −5° C.) is long so that water in the tissues (cells) of the foods becomes ice crystals which grow and cause tissue breakdown, thereby resulting in the main cause of quality degradation due to dripping at the time of thawing.

Accordingly, in order to prevent quality degradation of foods due to freezing, it is important to pass the foods through the maximum ice crystal generation zone in a short time.

The brine system has as high as about 20 times the heat conductivity compared to the air blast system (Table 1) and is favorable when high quality foods are produced by rapid freezing. However, currently, when most frozen foods are unwrapped, the air blast system is predominant.

TABLE 1

Coefficient of heat conductivity (W/m² · K) of medium

| medium | coefficient of heat conductivity | condition |
| --- | --- | --- |
| inactional air | 4.5~8 | |
| air in air blast (I) | 12~23 | air flow velocity 1.5~2 m/s |
| air in air blast (II) | 23~35 | air flow velocity 4~5 m/s |
| brine freezing | 400~500 | flow liquid |
| in contact freezing device | 30~100 | metal |

Meanwhile, there exists a desire for higher quality frozen foods, and a refrigerator has been developed which provides higher heat conductivity due to the application of a high-voltage electric field of 5 to 50 kV and an alcohol brine freezing which is capable of rapidly freezing in an extremely short time and also has low running costs (Japanese Patent No. 3639499 (Patent Document 1) and Japanese Laid-Open Publication No. 8-126465 (Patent Document 2)).

However, these conventional methods have the following problems.

When an alcohol is used as the cooling medium, the medium absorbs water from the air and reduces the alcohol content thereof, and therefore, the temperature is hardly reduced. Accordingly, the freezing temperature is also high. For example, when ethanol is used as the brine, although ethanol is safe for foods, low in viscosity and consequently useful as a cooling medium for the brine system, there is a problem that when an aqueous ethanol solution is cooled to −35° C. or lower, the solution adsorbs water in the air during operation, reducing the ethanol content, thereby raising the freezing temperature.

[Patent Document 1] Japanese Patent No. 3639499
[Patent Document 2] Japanese Laid-Open Publication No. 8-126465

SUMMARY OF THE INVENTION

The present invention solves the above-mentioned problems and aims to provide a brine composition for a frozen food, a food refrigerator, and a method for producing a frozen food, which does not raise the freezing temperature even if the ethanol concentration is low, and is therefore able to suppress tissue breakdown caused by the growth of ice crystal of water in the tissues (cells) of foods.

That is, the brine composition for a frozen food of the present invention can achieve the above-mentioned objects by containing 30 to 70% by weight of ethyl alcohol, 0.5 to 10.0% by weight of erythritol, and water.

In one embodiment, the concentration of the ethyl alcohol is 35 to 60% by weight, the concentration of the erythritol is 0.8 to 5.0% by weight, and the rest is water.

The food refrigerator of the present invention is provided with a refrigeration tank containing a brine composition, a refrigerating machine for cooling the brine composition, and a high-potential electric field generating means for generating an electric field in the brine composition, where the brine composition contains 30 to 70% by weight of ethyl alcohol, 0.5 to 10.0% by weight of erythritol, and water, whereby the above-mentioned objects can be achieved.

In one embodiment, in the brine composition, the concentration of the ethyl alcohol is 35 to 60% by weight, the concentration of the erythritol is 0.8 to 5.0% by weight, and the rest is water.

The method for producing a frozen food of the present invention includes the steps of sealing a food in a bag, immersing the bag in which the food is sealed into a brine composition, and freezing the brine composition while applying an electric field thereto, wherein the brine composition contains 30 to 70% by weight of ethyl alcohol, 0.5 to 10.0% by weight of erythritol, and water, whereby the above-mentioned objects can be achieved.

In one embodiment, in the brine composition, the concentration of the ethyl alcohol is 35 to 60% by weight, the concentration of the erythritol is 0.8 to 5.0% by weight, and the rest is water.

Since the brine composition for a frozen food of the present invention contains 30 to 70% by weight of ethyl alcohol, 0.5 to 10.0% by weight of erythritol, and water, it is possible to depress the freezing point of the brine composition without impairing the safety of foods.

Accordingly, when brine-freezing a food by generating a high-voltage electric field in a brine composition, it is possible to pass the food through the maximum ice crystal generation zone where the temperature of the brine composition for a frozen food is 0 to −5° C. more rapidly. Therefore, the growth of ice crystal formed by water contained in food materials can be suppressed to prevent tissue breakdown, and the condition of the food materials before freezing can be maintained until after thawing.

That is, since the freezing point of the brine composition is not raised during operation, the time for foods to pass through the maximum ice crystal generation zone (−1 to −5° C.), which is important for the quality of foods in freezing, can be reduced compared with a conventional brine freezing method. As a result, fresh frozen foods excellent in texture and color and with reduced dripping at the time of thawing can be produced.

Additionally, since erythritol is used as a freezing point depressant in the present invention, the following advantages can be obtained.

(1) As the freezing point depressant for water, diethylene glycol used in radiator water in cold climates is well known. In addition, for foods, sugar alcohols such as propylene glycol are used.

An ethanol solution containing erythritol is lower in viscosity than these other sugar alcohols. In brine freezing, the workability thereof is good and the loss of a solvent is small when a low-viscosity freezing liquid is used.

(2) Erythritol is higher in solubility than other sugar alcohols at a high ethanol concentration. Since the degree of depression of the freezing point is proportional to the concentration of a solute, the high solubility is advantageous for the freezing point depressant. Although ethylene glycol and propylene glycol are highly in soluble in water, they are high in viscosity.

(3) Erythritol is higher in the degree of depression of the freezing point than other sugar alcohols. For example, the freezing point of 20% by weight of erythritol is −4° C., the freezing point of the same concentration of sucrose is −1.2° C., and the freezing point of the same concentration of sorbitol is −2.5° C.

(4) Low corrosivity of refrigerator

The corrosivity of erythritol is low compared with salt, citric acid and the like which are often used for an ethanol solution as a freezing solvent.

(5) Examples of the freezing point depressant for water include erythritol anhydride. However, erythritol is not used for the freezing point depressant for water.

DESCRIPTION OF THE PREFERRED EMBODIMENTS

Figure 1:
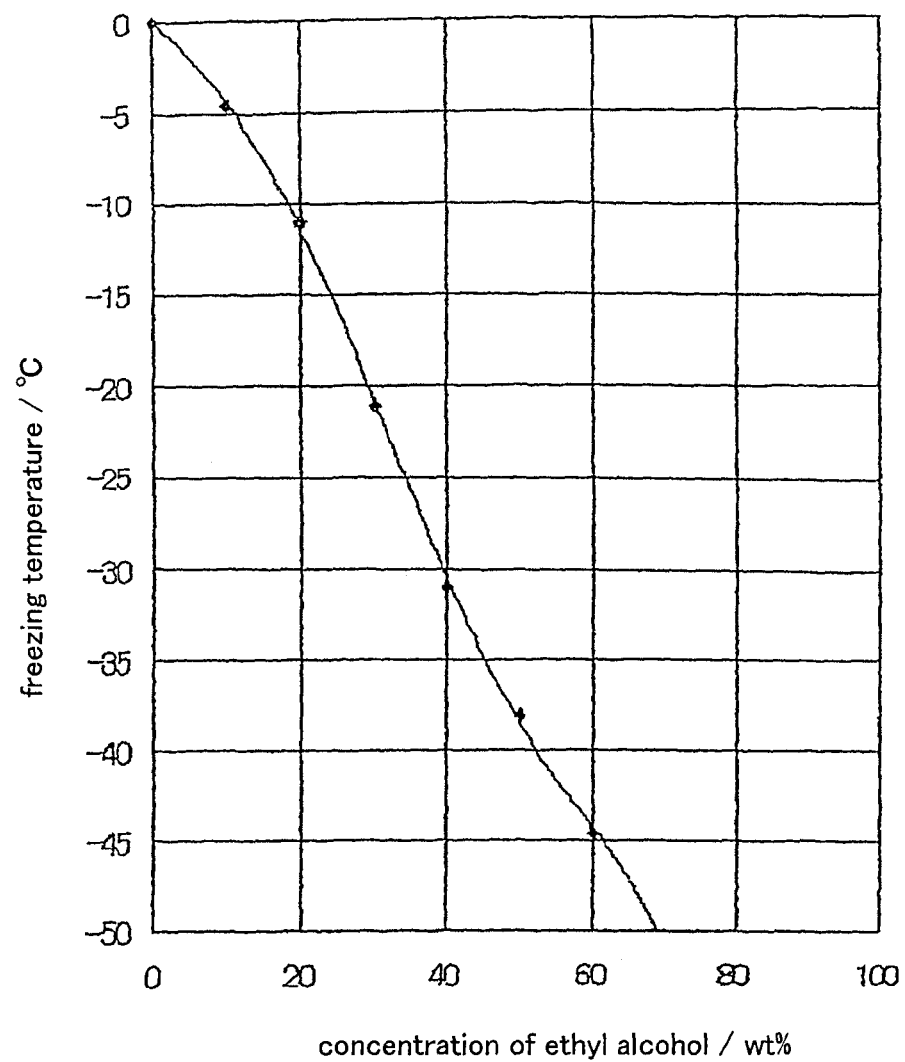
FIG. 1 is a graph showing the relationship between the concentration of the aqueous alcohol solution and the freezing temperature thereof.

Hereinafter, embodiments of the present invention will be explained in detail.

The brine composition for a frozen food of the present invention (hereinafter also referred to as a "cooling medium") contains 30 to 70% by weight of ethyl alcohol, 0.5 to 10.0% by weight of erythritol, and water. A preferable concentration of the ethyl alcohol is 35 to 60% by weight, and a more preferable concentration is 40 to 50% by weight. A preferable concentration of the erythritol is 0.8 to 5.0% by weight, and a more preferable concentration is 1.0 to 3.5% by weight.

When the concentration of the ethyl alcohol in the brine composition is less than 30% by weight, the freezing temperature hardly reaches −25° C., and when the concentration of the ethyl alcohol exceeds 70% by weight, the freezing temperature is −50° C. or lower, but the load on the refrigerator is large and the maintenance of the predetermined temperature is difficult and therefore, such is not economical.

When the concentration of the erythritol is less than 0.5% by weight, there may be a case where freezing occurs when the brine composition is kept, for example, at −40° C. for 60 minutes, and the effect as the freezing point depressant is small. When the concentration of the erythritol exceeds 10% by weight, the solubility of the erythritol is lowered and the erythritol does not dissolve when the alcohol concentration is 58%.

The food freezing method of the present invention includes the steps of, using the above-mentioned brine composition, immersing a bag in which a food is sealed into the brine composition, and freezing the brine composition while applying an electric field thereto in the immersed state.

Examples of the foods which can be frozen by the freezing method of the present invention include general foods, that is, fishery products such as fish, clams, seaweed, shellfish and fish eggs, livestock products such as beef, pork, chicken and eggs, agricultural products such as root vegetables and fruits, and cooked and processed products of these foods. In particular, examples of the foods for which the present invention is useful include foods mainly composed of proteins such as seafood and livestock products and processed products thereof.

The food refrigerator of the present invention is provided with a refrigeration tank containing the brine composition above, a refrigerating machine for cooling the brine composition, and high-potential electric field generating means for generating an electric field in the brine composition.

In the present invention, the brine system includes a method for freezing a food in which a high-voltage electric field is generated in the brine using a brine refrigerator containing brine into which one electrode from a high-voltage electric field generating means is inserted. It is preferable that the temperature of brine is in the range of from −20 to −50° C. and the electric potential generated by the high-voltage electric field generating means is 5 to 50 kV.

Further, the freezing step is preferably carried out such that the food passes through the temperature range of from 0 to −5° C. within 15 minutes and freezing is carried out until the temperature falls within the range of from −20 to −50° C.

The outline of the refrigerator of the present invention is as follows.

That is, one of two electrodes of the high-voltage electric field generating means is inserted into the brine in the brine refrigerator. The other electrode is not inserted into brine in the brine refrigerator but subjected to insulation treatment in order that a current does not flow between the two electrodes. These electrodes are connected to a secondary side of a high-frequency potential generator as described in Japanese Examined Patent Publication No. 38-6106.

Brine is cooled by the refrigerating machine connected to the refrigerator and circulated by a circulation device using a drive motor and whereby the temperature in the tank containing the brine is kept constant.

Upon installing a cooling device, the high-voltage electric field generating means and the drive motor of the circulation device, insulating glass is used as a support between the floor surface and each device.

Examples of the usable commercially available product include a high-voltage electric field alcohol refrigerating machine (product name: Quick Freezer Type RQF-50, manufactured by Alpha System).

Figure 2:
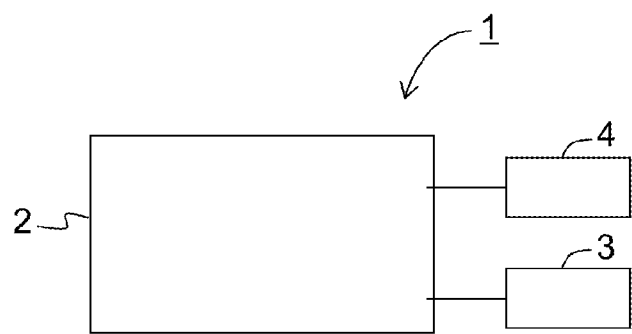
FIG. 2 is an illustration of a food refrigeratir in accordance with an embodiment of the present invention.

Specifically, as seen in FIG. 2, the food refrigerator 1 of the present invention is provided with a refrigeration tank 2 containing a brine composition (cooling medium) maintained at low temperature, a cooling medium drive part which is provided in the refrigeration tank and driven by an electric motor such that the cooling medium in the tank is stirred or circulated, a part for elevating articles to be frozen which is provided for supporting foods and immersing the foods into the cooling medium in the refrigeration tank and is driven by an electric motor, and a refrigerating machine 3 for cooling the cooling medium which is driven by an electric motor. The food refrigerator 1 of the present invention is further provided with a high-potential electric field generating means 4 for generating an electric field in the cooling medium.

The food refrigerator of the present invention is configured such that the refrigerator is electrically insulation-supported in its entirety relative to the floor surface where the refrigerator is installed, each of the electric motors is electrically insulation-supported by an attaching part, and the motor output is carried out through an electrically insulated belt.

Since the refrigerator is insulation-supported in its entirety relative to the floor surface, it is possible to apply an electric field with no difficulty to the cooling medium in the refrigeration tank from the high-potential electric field generating means. In addition, the electric motors, which are driving sources of the respective parts for mechanically driving the refrigerator, are configured to be insulation-supported relative to the attaching part and also to transmit the drive force through the insulated belt. With this configuration, the high-potential electric field generating means does not influence the electric motors and therefore, the respective operation parts operate reliably.

By using the refrigerator, an electric field to which a high electric potential of 5 to 100 kV is applied is generated in a cooling medium cooled to −20 to −50° C., and a food packed in a container made of polyethylene or the like is immersed in the cooling medium for 10 to 60 minutes to produce a frozen food. A liquid preparation may be contained in the container. In this manner, by sealing a food in a container, the food can be brine-frozen without contacting the cooling medium, and thawing and cooking can be done at the same time.

As described above, in the present invention, heat conductivity of the brine composition can be further heightened, thereby rapidly freezing foods in an extremely short time by applying a high-voltage electric field upon brine-freezing.

EXAMPLES

Hereinafter, the present invention will be specifically described by way of illustrative examples, but the present invention is not limited by these examples.

Example 1

Ethanol is safe for foods, low in viscosity and useful as a cooling medium for the brine system, but there is a problem when an aqueous ethanol solution is cooled to −35° C. or lower, the solution adsorbs water in the air reducing the ethanol content, thereby raising the freezing temperature.

Therefore, investigations were made to lower the freezing temperature and to obtain a freezing point depressant which does not raise the freezing temperature even if the ethanol concentration is low.

(1) As the freezing point depressant, investigated were the following surfactants, polyhydric alcohols and the like, which can be added to foods.

Surfactants: glycerin fatty acid ester (monoglycerin), sucrose fatty acid ester (sucrose ester), sorbitan fatty acid ester (sorbitan ester), propylene glycol fatty acid ester, soybean phosphatide (lecithin)

Polyhydric alcohols: ethylene glycol, propylene glycol, glycerin, erythritol, mannitol, sorbitol, reduced malt sugar syrup (2) Method of Experiment and Results As the cooling medium or refrigerant, ethylene glycol is often used as the cooling medium.

Therefore, an additive which is as effective as or more effective than ethylene glycol and is safe for foods was sought.

In food freezing, it is necessary that the food passes through the maximum ice crystal temperature zone of 0 to −5° C. rapidly and that the temperature is lowered to −25° C. or lower in a short time. Therefore, a refrigerator which is capable of normal operation at −35 to −40° C. is desired.

Accordingly, an experiment was carried out on a 40% alcohol solution to which each of the freezing point depressants shown in Table 2 was added.

The relationship between the aqueous ethanol solution and the freezing temperature is shown in FIG. 1. From FIG. 1, the freezing temperature of the 40% alcohol solution is −31° C.

Each of the additives were added to the 40% alcohol solution at concentrations of 1.0% and 2.5% and the solubility of the cooling medium at normal temperature, −35° C., and −40° C. was investigated. The results are shown in Table 2.

TABLE 2

|  | 1% solution | 2.5% solution |
|---|---|---|
| (A) propylene glycol | good | good |
| (B) glycerin | good | good |
| (C) erythritol | good | good |
| (D) manitol | poor | poor |
| (E) sorbitol | good | poor |
| (F) reduced malt sugar syrup | good | poor |
| (H) control |  | poor |

In Table 2, "good" means that the additive was dissolved and "poor" means that the additive was not dissolved.

As shown in Table 2, erythritol showed an effect same as or better than that of ethylene glycol, followed by propylene glycol and glycerin. However, glycerin and propylene glycol became more viscous with the temperature reduction, and they are not suitable as the freezing point depressant for food freezing.

(3) Conclusion

As the freezing point depressant suitable for the alcohol brine freezing method employed for foods, erythritol is the most suitable, followed by propylene glycol and glycerin.

Various surfactants and sugar alcohols having 5 or more carbon atoms are poor in solubility in alcohols and low in efficacy for depressing the freezing point.

Erythritol, a tetrose alcohol, is a natural sugar contained in fruits, fungi, and fermented foods such as wine and soy sauce and is recognized as a food additive, that is, an alternative sweetener to sugar.

Example 2

(1) To a 40% ethanol solution were added 1%, 3%, 5%, 10%, and 15% erythritol and the solubility of erythritol in each of the resulting five ethanol solutions was investigated at different temperatures (normal temperature, −35° C., and −50° C.). The results are shown in Table 3.

TABLE 3

|  |  | normal temperature | −35° C. | −50° C. |
|---|---|---|---|---|
| erythritol | 1% | − | − | − |
|  | 3% | − | − | − |
|  | 5% | − | − | ± |
|  | 10% | − | − | + |
|  | 15% | ± | + | + |

(−): erythritol was dissolved
(±): erythritol was dissolved after 30 minutes
(+): erythritol was not dissolved (2) To a 58% ethanol solution were added 1%, 3%, 5%, 10%, and 15% erythritol and the solubility of erythritol in each of the resulting five ethanol solutions was investigated at different temperatures (normal temperature, −35° C., and −50° C.). The results are shown in Table 4.

TABLE 4

|  |  | normal temperature | −35° C. | −50° C. |
|---|---|---|---|---|
| erythritol | 1% | − | − | − |
|  | 3% | − | − | − |
|  | 5% | − | − | ± |
|  | 10% | ± | ± | + |
|  | 15% | + | + | + |

(−): erythritol was dissolved
(±): erythritol was dissolved after 30 minutes
(+): erythritol was not dissolved As shown in Tables 3 and 4, erythritol is high in solubility under a high ethanol concentration and was recognized as being an excellent freezing point depressant.

The 10% erythritol solutions each dissolved in 40% ethanol and 58% ethanol did not form a precipitate even when a high voltage of 20 kV was applied at −35° C.

From the above, it was recognized that, in a 58% ethanol solution, 5% erythritol was dissolved at a temperature of −55° C. or higher, and 10% erythritol was dissolved at a temperature of −35° C. or higher.

Example 3

(1) To a 40% alcohol solution was added 1.0% or 2.5% of each sugar alcohol shown in Table 5, and each mixture was allowed to stand at −40° C. for 60 minutes to investigate the crystallization of the cooling medium and the presence or absence of a precipitate.

TABLE 5

| freezing point depressant | 1% solution | 2.5% solution |
|---|---|---|
| (A) propylene glycol | no freezing | no freezing |
| (B) glycerin | no freezing | no freezing |
| (C) erythritol | no freezing | no freezing |
| (D) marine crystal (manitol) | no freezing | freezing |
| (E) sorbitol | no freezing | freezing |
| (F) Amalty (reduced malt sugar syrup) | no freezing | freezing |

(2) Results

All of the sugar alcohols did not cause freezing when 1.0% of each sugar alcohol was added.

Among the sugar alcohols, mannitol, sorbitol and Amalty (reduced malt sugar syrup) caused freezing when 2.5% of each sugar alcohol was added.

Erythritol did not cause freezing and was regarded as a probable freezing point depressant.

What is claimed is:

1. A liquid brine solution at −35 degrees to −50 degrees Celsius for freezing food, the brine solution comprising an ethyl alcohol, erythritol and water, wherein the concentration of the ethyl alcohol is 35 to 60% by weight, the concentration of the erythritol is 1 to 3% by weight, and the rest is water.

2. The brine solution according to claim 1 wherein the brine solution is at −50 degrees Celsius.

3. A food refrigerator comprising a refrigeration tank containing a liquid brine solution, a refrigerating machine for cooling the liquid brine solution, and high-potential electric field generating means for giving an electric field in the liquid brine solution, wherein the liquid brine solution is at −20 degrees to −50 degrees Celsius contains 35 to 60% by weight of ethyl alcohol, 1-3% by weight of erythritol, and the rest water.

4. The food refrigerator according to claim 3 wherein the brine solution is at −50 degrees Celsius.

5. The food refrigerator according to claim 3 further comprising an electric motor wherein the brine solution is stirred or circulated by the electric motor.

6. The food refrigerator according to claim 5 further comprising a part for elevating articles to be frozen and immersing the foods into the brine solution.

7. The food refrigerator according to claim 6 wherein the refrigerator is insulation supported in its entirety relative to the floor surface.

8. The food refrigerator according to claim 7 characterized in that a food is frozen within 15 minutes of immersion in the brine solution.

9. The food refrigerator according to claim 8 wherein the brine solution is at −50 Celsius.

10. A liquid brine composition for freezing food which is a solution at −35 to −50 degrees Celsius comprising ethyl alcohol, erythritol, and water wherein the concentration of the ethyl alcohol is 35 to 60% by weight, the concentration of the erythritol is 1 to 3% by weight, and the rest is water.

* * * * *